(12) United States Patent
Lawrence (10) Patent No.: US 7,508,532 B2
(45) Date of Patent: Mar. 24, 2009

(54) METHOD AND SYSTEM FOR SANDBOXING PRINTER DRIVERS

(75) Inventor: Mark Lawrence, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1039 days.

(21) Appl. No.: 10/441,572

(22) Filed: May 20, 2003

(65) Prior Publication Data

US 2004/0252325 A1  Dec. 16, 2004

(51) Int. Cl.
G06F 15/00 (2006.01)
G06K 1/00 (2006.01)

(52) U.S. Cl. ............... 358/1.13; 358/1.12; 358/1.14; 358/1.15; 358/1.18; 345/650; 709/203; 709/209

(58) Field of Classification Search ........... 358/1.13, 358/1.15, 1.1, 1.2; 719/328; 709/203, 226; 345/650

See application file for complete search history.

(56) References Cited

U.S. PATENT DOCUMENTS

| | | | | |
|---|---|---|---|---|
| 5,920,688 A | * | 7/1999 | Cooper et al. ............... | 345/650 |
| 5,982,996 A | * | 11/1999 | Snyders ...................... | 358/1.15 |
| 6,320,667 B1 | * | 11/2001 | Mitsuhashi .................. | 358/1.1 |
| 6,334,158 B1 | * | 12/2001 | Jennyc et al. ................ | 719/328 |
| 6,967,730 B2 | * | 11/2005 | Tomita ....................... | 358/1.13 |
| 7,064,858 B2 | * | 6/2006 | Iwai et al. .................... | 358/1.2 |
| 7,113,293 B2 | * | 9/2006 | Mori et al. .................. | 358/1.13 |
| 7,206,844 B2 | * | 4/2007 | Gupta et al. ................. | 709/226 |
| 2002/0089688 A1 | * | 7/2002 | Ferlitsch et al. ............ | 358/1.15 |
| 2004/0070785 A1 | * | 4/2004 | Ferlitsch .................... | 358/1.15 |
| 2004/0073606 A1 | * | 4/2004 | Verma et al. ................ | 709/203 |
| 2004/0165210 A1 | * | 8/2004 | Jamison et al. ............ | 358/1.15 |
| 2004/0193678 A1 | * | 9/2004 | Trufinescu et al. .......... | 709/203 |

* cited by examiner

*Primary Examiner*—Edward L Coles
*Assistant Examiner*—Satwant K Singh
(74) *Attorney, Agent, or Firm*—Shook, Hardy & Bacon L.L.P.

(57) ABSTRACT

A method, medium, and computer-program product are provided to isolate (sandbox) printer drivers from other systems. A print processor and printer driver are moved into a separate process. A spooler communicates with the print processor through a shim, proxy, and stub. A component activation manager (CAM) maintains a database of the printer drives installed on a computer system. A component activation interface (CAI) facilitates startup and shutdown of the sandbox process.

10 Claims, 8 Drawing Sheets

METHOD AND SYSTEM FOR SANDBOXING PRINTER DRIVERS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to application programming. More particularly, the present invention relates to a method and system for isolating a printing process in a computing environment.

BACKGROUND OF THE INVENTION

Current printer drivers and printing processes required to provide printing functionality can compromise a system's stability. A printer driver typically includes at least two components: a rendering driver and a print processor. GDI is a system Graphics Device Interface. A printer driver implements a Driver Device Interface (DDI), which is graphical, but not the GDI. The GDI receives requests from an application to draw graphic primitives and, in turn, passes them on to the printer driver. The printer driver then converts these primitives to a print-ready format such as PCL or Postscript.

The application uses GDI and the print driver to send graphics primitives to a file managed by the print spooler. The print processor, running in the print spooler, then retrieves the graphics primitives from the GDI or the printer driver in the application space. To produce the output for the printer, the print processor retrieves recorded primitives and drives them through the GDI and the printer driver again.

These and other current printer-driver models suffer from poor designs that can lead to the crippling of an entire system. Prior-art printer drivers can bring a system down if the driver becomes corrupt. Running with almost unrestricted privileges, current drivers are inherently insecure. Diagnosing problems stemming from faulty printer drivers is currently highly complex.

Currently, a printer driver runs with the full privileges of a print system. Thus, a poorly (or defectively) written printer driver can substantially damage both the print system and the operating system as a whole. Prior-art printer drivers can inadvertently modify the state of a print system because they share the same address space. Drivers can also modify each others' state. Further, bugs in the print system can result in the driver's state being changed. Determining a source of driver failure can be extremely difficult. Printer-system reliability and diagnostic ability are currently inadequate and there is no effective way to restrict privileges of driver code. Finally, flaws in a printer driver could be exploited to allow the system to be attacked.

The current state of the art could be improved by providing a better printer-driver system and method for implementing the same by sandboxing the printing process.

SUMMARY OF THE INVENTION

The present invention generally relates to a method and system for sandboxing printer drivers. Sandboxing is a technique for controlling the execution environment of code portions or modules. The method includes allowing each of an optional group of printer drivers to run in its own process. The present invention offers several practical applications in the technical arts, not limited to providing a robust and reliable driver model; allowing a spooler to remain available even if one or a few printer drivers fail; allowing printers to remain available even if one or more other printer drivers fail; isolating both the printer driver and the print processor; and reducing communications between the print processor and the spooler, which makes optimizing the remaining communications easier.

As will be described in greater detail with respect to a preferred embodiment, the print processor and the driver are relegated to separate processes. The present invention includes a rendering driver and a print processor. The printer driver can also include two components, a language monitor and a port monitor. The port monitor communicates with the device, and the language monitor uses the port monitor to retrieve device-specific configuration information. These components could also be isolated, but doing so may not significantly increase robustness because the system-provided language monitor and port monitor are used frequently. And when replaced by vendors, these components have historically been small, robust components. A spooler communicates with the print processor through a shim, proxy, and a stub. A component activation manager (CAM) maintains a database of all of the various printer drivers installed on a system. This database can group printer drivers together. The groups can be predefined by the system or can be created by an administrative user.

It is therefore a primary object of the present invention to protect a print system from defective printer drivers. That is, one of the objects of the present invention is to isolate the print system from faults associated with a printer driver(s) and print processor. Using process isolation, an embodiment of the present invention protects the print system's address space and internal data structures from the printer driver and print processor. Thus, if the print processor or printer driver fails, they will not damage data required by the print system to continue operating.

In a preferred embodiment, this is accomplished by providing sandboxing capability to printer drivers, which will provide a method and apparatus to control the handling of various code-execution malfunctions. For example, when a printer driver crashes, by accessing unallocated memory, the present invention can restart the respective process and attempt the operation again rather than terminating itself. Because many crashes are nondeterministic—the state that caused the crash is so complex as to practically preclude reproduction—and infrequent, automatically restarting certain faulty processes can greatly enhance overall reliability.

Another object of the invention is to allow privileges of certain code portions to be restricted. In the prior art, a printer driver runs with the full privilege of the print system. This is undesirable because such a scheme could damage both the print system and the operating system as a whole. The print system needs high privileges to perform some required operations against the operating system. Moreover, flaws in a printer driver could be exploited to compromise system integrity.

Still another object of the invention is to improve system-diagnostic capabilities. As briefly explained above, prior-art printer drivers could inadvertently modify the state of a print system because they share the same address space. Bugs in the print system could result in the driver's state being changed. Determining the cause of a driver failure in this environment is difficult even for an experienced developer. Administrative users do not have the ability to determine which driver is faulty beyond removing drivers until the system becomes stable again. The present invention provides isolation between components via sandboxing, which significantly improves a system's diagnostic ability.

Other objects of the invention will be made clear or become apparent from the following description and claims.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a method and suite of tools to sandbox printer drivers, thereby isolating the printing process from other systems. Driver sandboxing is a feature that increases spooler availability and reliability by identifying failing drivers and allowing them to be run in a more protected layer—sandboxing architecture—to prevent spooler-wide failures. An exemplary operating environment for the present invention is described below.

Acronyms and Shorthand Notations

Throughout the disclosure of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

API Application Program Interface(s)
    CAI Component Activation Interface
    CAM Component Activation Manager
    CIDB Component Isolation Database
    COM Component Object Model
    DCOM Distributed Component Object Model
    DDI Driver Device Interface
    DDK® Driver Developer's Kit
    DLL Dynamic(ly) Linked Library
    GDI Graphics Device Interface
    OLE Object Linking and Embedding
    PCL Printer (Process) Control Language
    RPC Remote Procedure Call
    SDK® Software Developer's Kit Further, various computing and technical terms, some of which may vary from what would otherwise be a plain meaning, are used throughout this disclosure. Definitions and explanations of such terms can be found in the Software Developer's Kit (SDK®) and Driver Developer's Kit (DDK), both available online at http://msdn.microsoft.com. The definitions are intended to provide a clearer understanding of the ideas disclosed herein but are in no way intended to limit the scope of the present invention. The definitions and terms should be interpreted broadly and liberally to the extent allowed by the art and the meaning of the words offered in the above-cited reference.

Exemplary Operating Environment

Figure 1:
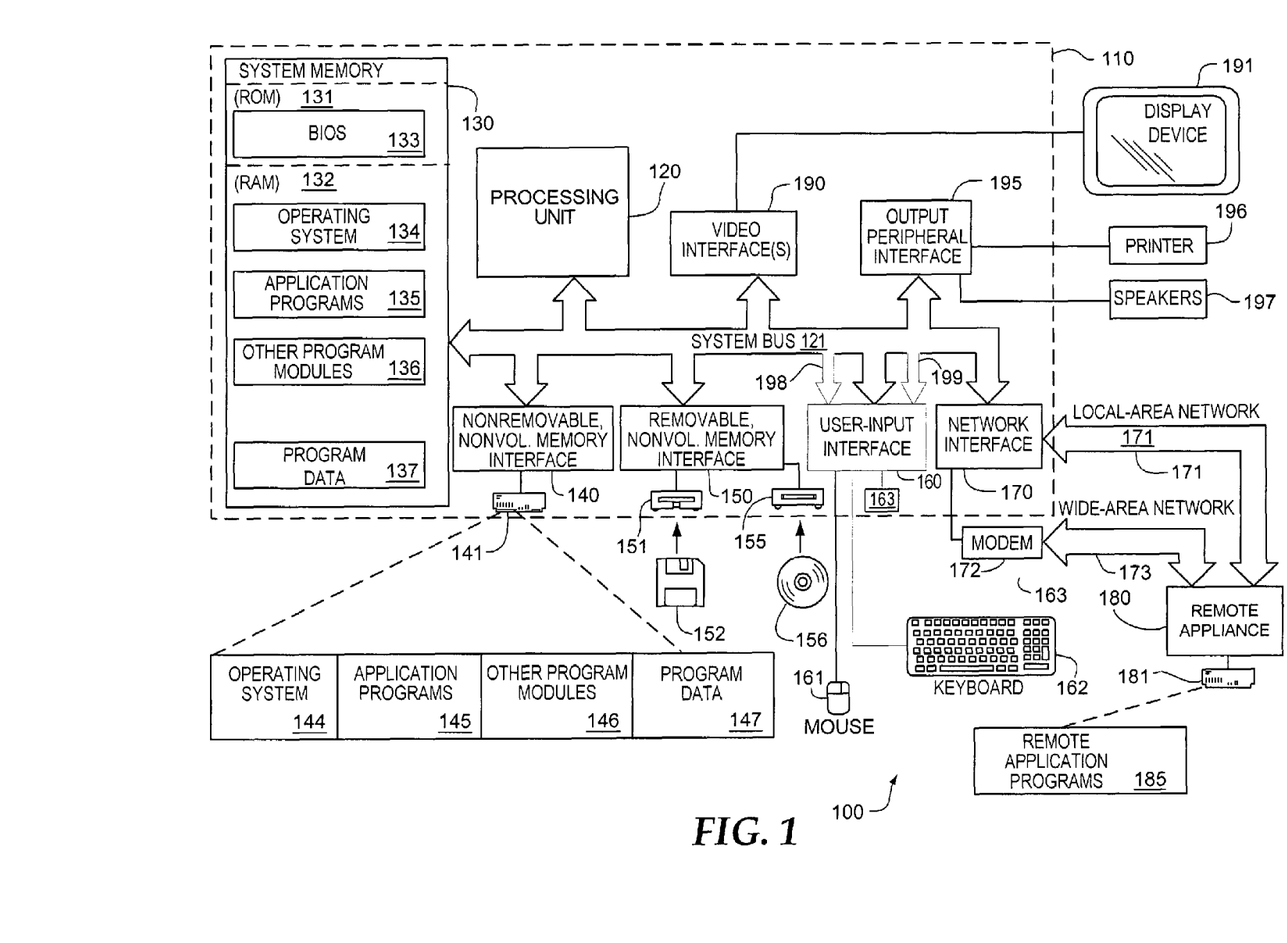
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer code or computer-executable instructions, such as program modules, being executed by a computer. Generally, program modules include routines, programs, objects, components, data structures, etc., and refer to code that performs particular tasks or implements particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer storage media including memory storage devices.

With reference to FIG. 1, an exemplary system 100 for implementing the invention includes a general-purpose-computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer storage media and communication media. Examples of computer storage media include, but are not limited to, Random Access Memory (RAM); Read Only Memory (ROM); electronically erasable programmable read-only memory (EEPROM); flash memory or other memory technology; CD-ROM, digital versatile disks (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A basic input/output system 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; or a wireless transceiver 163. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 139A port, or a universal serial bus (USB).

A display device 191 is also connected to the system bus 121 via an interface, such as a video interface 190. Video interface 190 could also accept an incoming video signal. Display device 191 can be any device to display the output of computer 110 not limited to a monitor, an LCD screen, a TFT screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer (sever, tablet, palmtop etc.) and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which can be stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

Printer Sandboxing

As previously mentioned, the present invention can be described in the general context of computer-useable instructions such as program modules executed by one or more computers or other computing devices such as personal data assistants (PDAs). The functionality of the program modules may be combined or distributed as desired in various embodiments to isolate a printing process. Although the present invention is applicable in a variety of operating environments, the following illustrative examples will be explained with respect to implementing the present invention in conjunction with the WINDOWS® operating system offered by the Microsoft Corporation of Redmond, Wash. Accordingly, many acronyms, interfaces, and modules will be referenced and one skilled in the art will appreciate the meaning of these terms and use of valuable interpretive references such as the aforementioned SDK® and DDK®.

Figure 2:
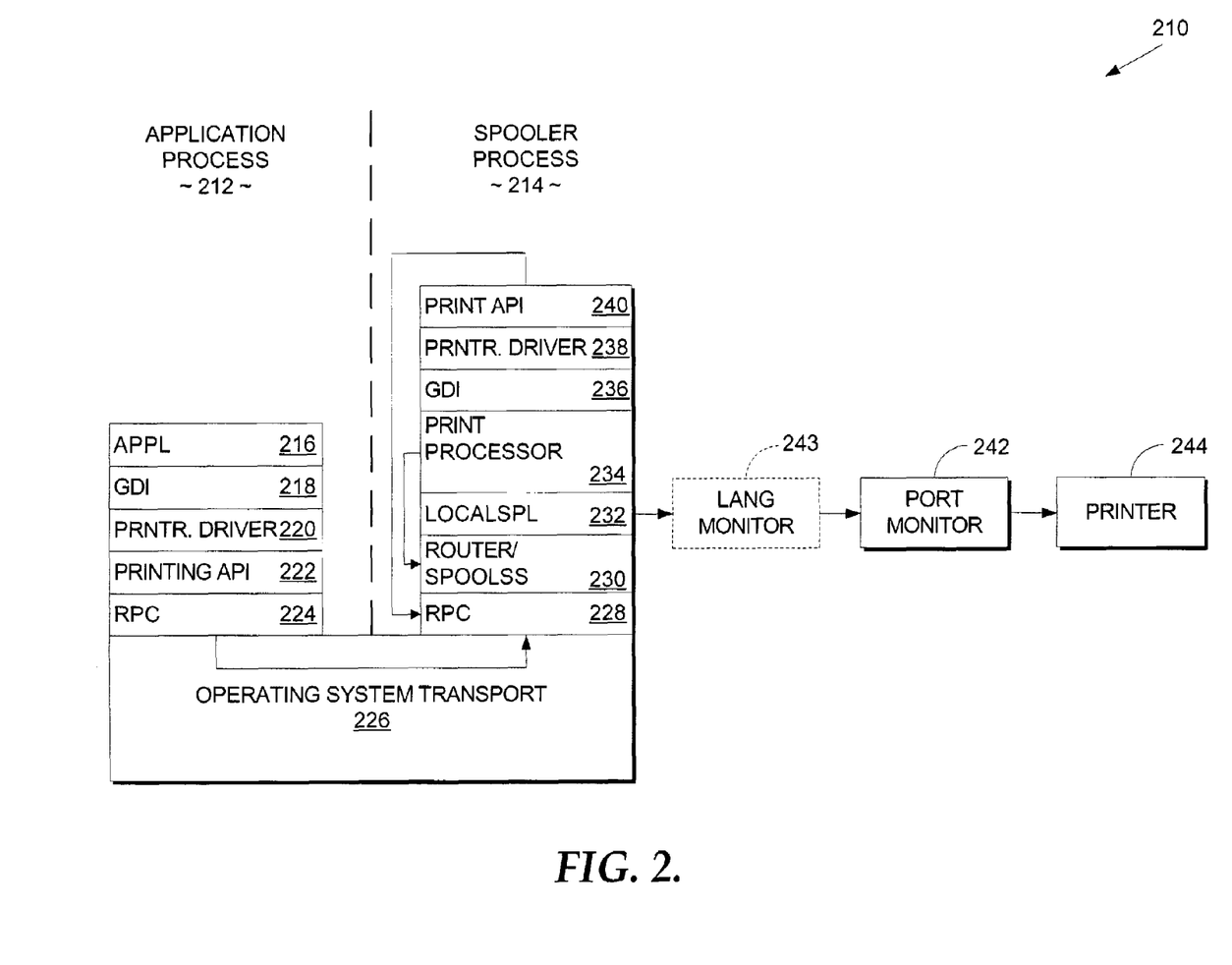
FIG. 2 depicts exemplary communication paths between nonsandboxed printing components.

A nonsandboxed printing scheme is depicted in the block diagram of FIG. 2 and referenced generally by the numeral 210. The system 210 includes an application process 212 and a spooler process 214. The application process 212 includes an application 216, a graphics device interface (GDI) 218, a printer driver 220, a printing API 222 (such as that exposed by exemplary DLL winspool.drv) that communicates with the print system via a client Remote Procedure Call (RPC) interface 224. The application process 212 communicates through an operating-system transport 226 to the spooler process 214 via a server RPC interface 228. The spooler process 214 also includes a router (such as spoolss.dll) 230, a local spooler 232, a print processor 234, a GDI 236, a printer driver 238, and print API 240. Note, the components illustrated in FIG. 2 that duplicately appear in the application process 212 and the spooler process 214 are identical in nature except that they are executed in either the application process 212 or the spooler process 214. They are duplicated and numbered separately in the drawing figures for ease of reference and clarification.

A printer driver can include a rendering driver and a print processor. The print processor does not need to run in the application process 212 because it reads the graphics primitives and drives them back through the driver via the GDI. The application 216 calls the GDI 218. The rendering driver exposes an interface, such as the DDI, to the graphic system, or GDI. The GDI receives requests from the application 216 (which is requesting that something be printed) to draw graphic primitives and in turn passes them on to a printer driver 220. The printer driver then converts these primitives to a print-ready format such as PCL or Postscript.

Print processor 234 retrieves data produced by the GDI or by the printer driver 220 in the application process 212. The print processor 234 then retrieves the recorded primitives and drives them through the GDI and the printer driver again to produce output for a printer. The present invention provides a default implementation of the print processor that many drivers use. Allowing the primitives produced by an application to be recorded and then played back provides at least two benefits. First, the print processor can manipulate a data stream before producing output. Manipulations that are typically performed are N-up printing, reversed printing, and booklet printing. Second, perceived application performance can be improved by deferring the expensive task of rendering the applications primitives to print ready output to an asynchronous process.

A printer driver can also include two components, referred to herein as a port monitor 242 and language monitor 243. The port monitor 242 communicates with the printing device 244. Generally, the port monitor 242 is provided by the system, but some drivers provide their own. In other embodiments, a driver may share the port monitor 242 between many models. The language monitor 243 uses the port monitor 242 to retrieve device-specific configuration information. The language monitor 243 is optionally placed between the localspl 232 and the port monitor 242 and uses the port monitor 242 to retrieve device configuration. Because the system-provided language monitor 243 and port monitor 242 are used frequently and are typically small, robust components, they do not need to be (but could be) sandboxed.

FIG. 2 depicts communications between application 216, the GDI, the printer driver, print processor and the spooler process 214. The basic communication between the application 216 and the spooler can occur transparently through the print-system-API library that, in turn, communicates via RPC 224 to the spooler process 214. The printing-system API 222 communicates with the spooler across process boundaries.

Figure 3A:
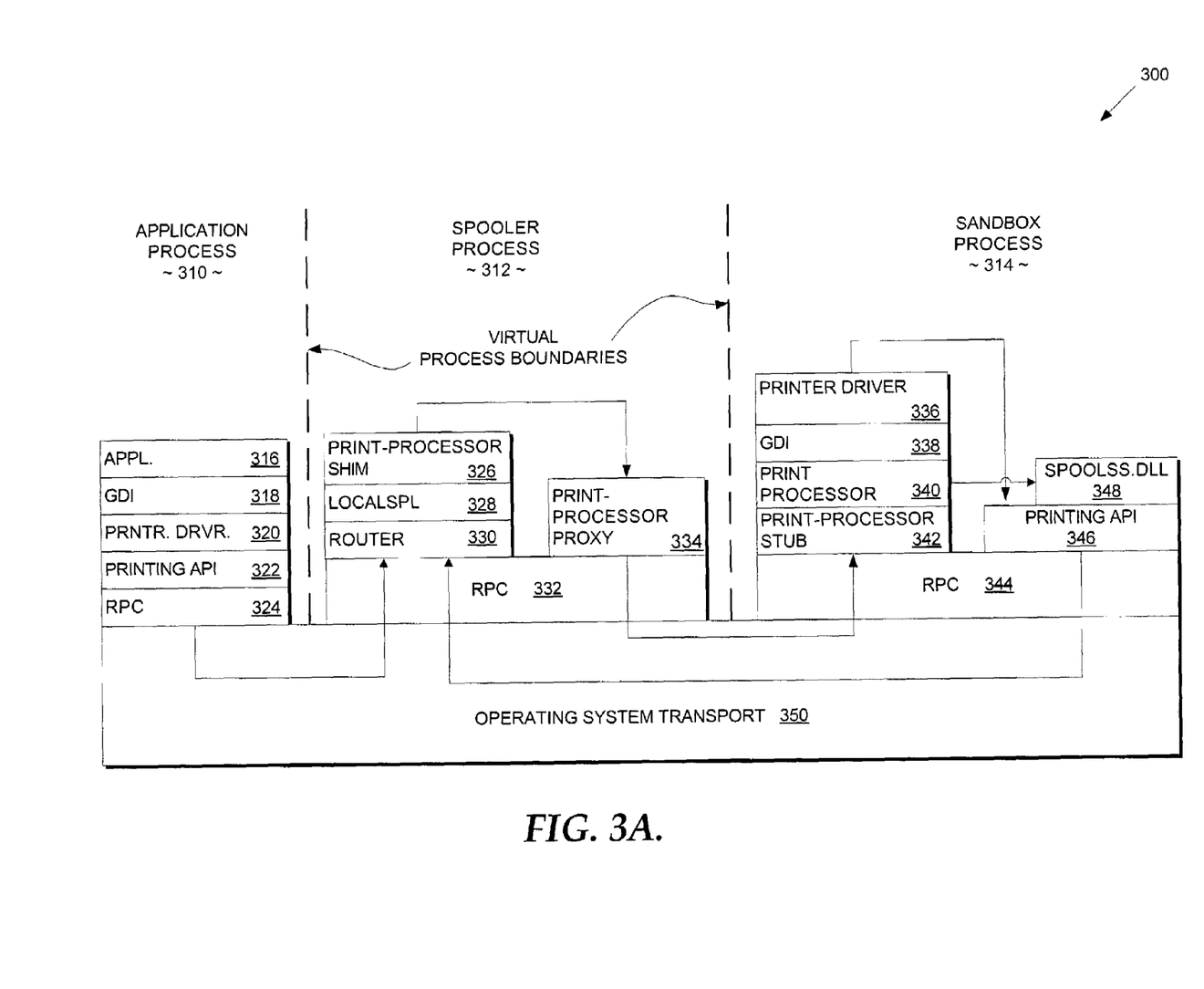
FIG. 3A depicts an exemplary communications topology of a sandboxed printing scheme.

FIG. 3A shows an exemplary configuration of the communication path between these components in an illustrative implementation of the present invention once they are sandboxed and is referenced generally by the numeral 300. In this configuration 300, an application process 310 and spooler process 312 are complemented by a sandbox process 314. The print processor 340 and the printer driver 336 are moved into the sandbox process 314. The spooler process 312 communicates with the print processor 340 via print-processor shim 326, print-processor proxy 334, and print-processor stub 342. In a preferred embodiment, the proxy 334 and the stub 342 are generated by COM.

The Component Object Model (COM) and Distributed Component Object Model (DCOM) are models used for object-oriented programming. The COM and DCOM specify how objects interact and communicate within a single application, a distributed application, or between applications (e.g., client/server applications) by defining a set of standard interfaces. Object interfaces are groupings of semantically related functions through which a client application accesses the services of a server application.

The COM is one model that defines an architecture for building objects and, in particular, defines the polymorphism between objects. COM is currently used extensively and its details are well known to those skilled in the art. COM also forms a constituent portion of the Object Linking and Embedding (OLE) environment of object-based services. OLE's framework and flexibility is also well understood by those skilled in the art. Currently, COM provides for certain communications and operations between objects, and objects used in a COM environment must conform to the COM definitions and rules. Additional information about COM can be found in the aforementioned SDK®.

Returning to FIG. 3A, the printer driver 336 continues to communicate with the spooler (hosted by the spooler process 312) through printing API 346 or its equivalent.

The print processor 340 links to spools.dll 348 or its equivalent. Spoolss.dll 348, in this embodiment, is modified to communicate through Printing API 346 back to the server since the APIs exposed through spoolss.dll 348 are almost identical to those in Printing API 346.

This interface, as previously mentioned, offers a variety of benefits. It isolates both the printer driver 336 and the print processor 340. The print-processor communication with the spooling process 312 is sparse and is mainly in the form of stream reads, which are relatively easy to optimize. In contrast, if GDI/printer-driver interfaces were used, many calls would have to be marshaled across the process boundary. These interprocess calls are resource intensive. In addition, a number of calls can communicate directly from the print system to the driver 336. Recall that an object of the present invention is to protect the print system (not necessarily applications) from a bad driver. The aforementioned calls can occur during driver installation or removal and print-queue creation or deletion. Preferably, these are also sent through a shim/proxy/stub combination to the sandbox process 314.

Although FIG. 3A illustrates an embodiment of a printing path between the spooler process 312 and the printer driver 336, a preferred embodiment includes a component to manage the sandbox process 314 and allow the spooler 312 to transparently connect to the correct driver and print-processor instance. As used herein, the term "Component Activation Manager" is attributed to the aforementioned functionality but is not to be construed as a limitation by name of the present invention. Those skilled in the art will appreciate that such a component (or group of components) could be given a variety of names but accomplish equivalent functionality.

The CAM maintains a database (described in greater detail below with reference to FIGS. 5A and 5B) of various printer drivers installed on a computer system. This database is referred to herein as the Component Isolation Database (CIDB).

In a preferred embodiment, printer drivers are (but do not have to be) grouped together into groups called bundles. Bundles can be predefined by the system or can be created by an administrative user. Each bundle can have an associated isolation level. Three exemplary isolation levels include: 1) "in process"—drivers in the same process as the spooler; 2) "out-of-process pooled"—drivers in a process common to the print system; 3) "out-of-process separate"—drivers that share the same process, which is a separately assigned process.

Printer drivers can be moved between bundles by a user, preferably an administrator. If the administrative user wants a driver to run in its own process, then a dedicated bundle can be created for the driver and be assigned to a separate process. In a preferred embodiment, the print system automatically creates four default bundles.

A signed-drivers bundle receives drivers that have been certified safe by a desired third party, such as a quality-assurance lab. These drivers would run in process (in-proc) by default for maximum performance. A printer driver should not require modification to run in the sandbox process. But assumptions made by the printer driver outside of the knowledge of the designers and implementers of the print system render a driver inoperable. For example, the printer driver might assume that it always runs in the same process as the port monitor (an invalid assumption from an architectural point of view, but, none-the-less often—but not always—true until now) and directly call into it. In the sandbox, this might fail, it might succeed, it might crash, or it might simply result in the driver not getting the data it expects.

The impact on the user will at the worst will be limited to the printer driver terminating in the sandbox process and being rendered inoperable. The print system will be unaffected. Other drivers will be unaffected if they are running in separate processes. It is for this reason that the flexibility of moving the driver to an in-proc bundle was provided, so that the user can accept that the driver is again capable of crashing the print system in exchange for getting it to work again. It is also for this reason that upgraded drivers are conservatively left running in the spooler process. A reasonably implemented printer driver will require no modification. Certain driver behaviors, which by definition cannot always be anticipated, might require that the driver be left in the spooler process to allow it to function.

An unsigned-drivers bundle receives drivers with no signatures or with signatures that are not recognized as being from a trusted source. This bundle would preferably be assigned to the pooled-isolation level by default. A risky-drivers bundle receives drivers found to be unreliable (perhaps say, during the development of the operating system), but are still sufficiently functional to be useful. This bundle would run in its own isolated process. Finally, an unknown-drivers bundle receives drivers that the system cannot determine as signed or unsigned. Such a scenario is typical during an upgrade. For maximum compatibility, this bundle will be given the in-proc isolation level. Typically, these drivers ran in-proc before the upgrade since sandboxing did not exist. After an initial assignment is performed, the administrator is free to change the bundle to which a driver is assigned.

When the CAM creates a sandbox process, it communicates with the sandbox process through an RPC interface defined on a named pipe specific to the sandbox process. This interface is referred to herein as the Component Activation Interface (CAI); see FIG. 3B. This interface is used to allow a targeted COM-object-instance activation to be sent to a particular process. It is also used to perform an orderly startup and to shutdown a sandbox processes.

CAM performs the following tasks in a preferred embodiment, it keeps track of all the sandbox processes created; monitors the number of component stubs maintained in each sandbox process; activates components in the appropriate process; appropriately allocates components in the local process if necessary; returns existing interfaces to existing components created in sandboxes and in the spooler processes; and when a process terminates unexpectedly, notifies all shims of the deactivation.

Figure 3B:
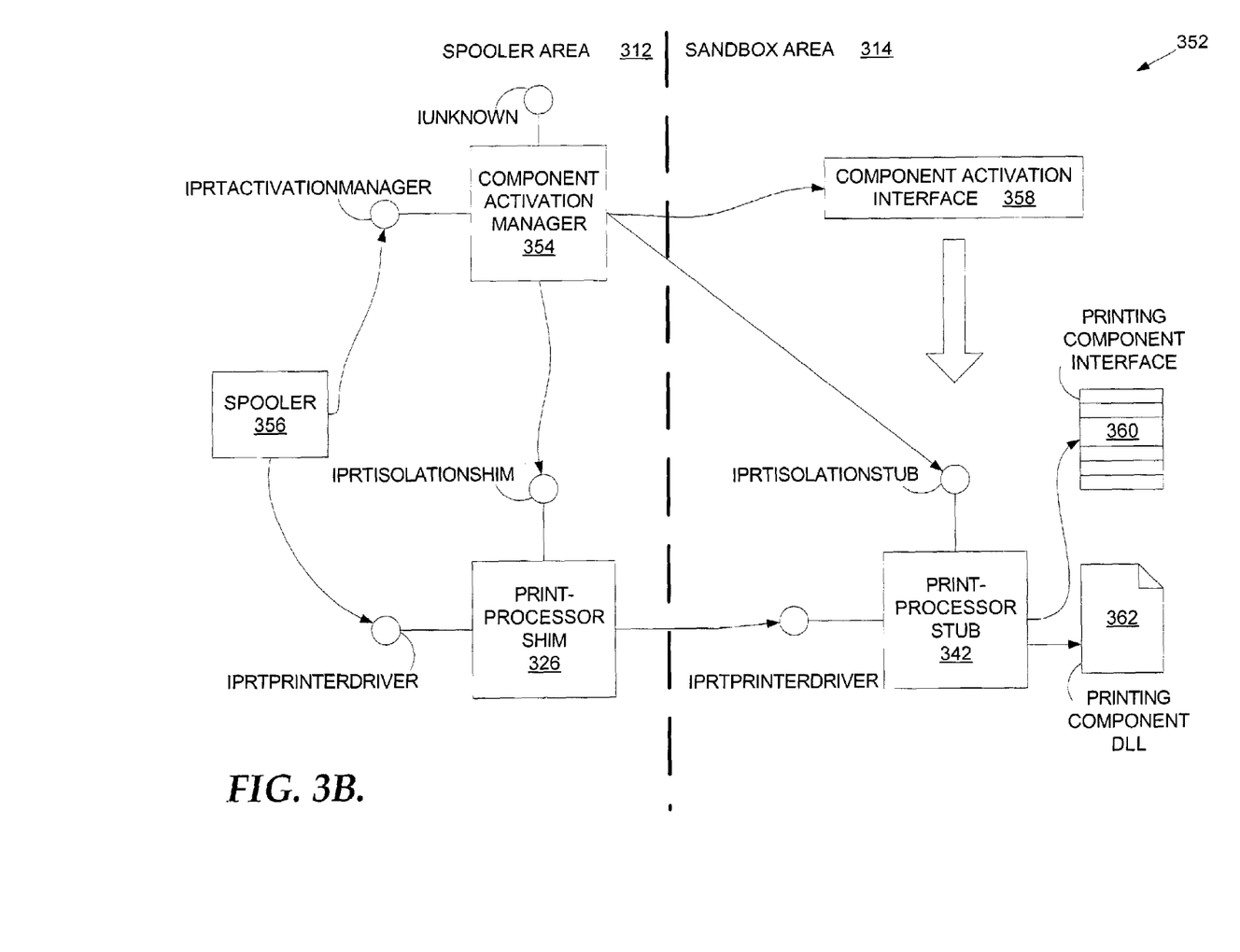
FIG. 3B is a block diagram depicting illustrative component interfaces used for sandboxing.

A simplified overview of illustrative component interfaces used in sandboxing is provided in FIG. 3B and referenced generally by the numeral 352. Note, that print-processor proxy and client-lifetime interfaces are omitted for simplicity. As shown, a CAM 354 is coupled to a spooler 356, print-processor shim 326, component-activation interface 358, and print-processor stub 342. The print-processor stub 342 is coupled to a print-processor interface 360 and print-processor DLL 362.

As briefly mentioned above, print-processor stub 342 expresses existing spooler component interfaces as COM interfaces. The spooler code uses the COM interfaces instead of the DLL-name-based interfaces that might have been supported in exemplary system 210. This offers an advantage of providing well-defined lifetime control and a well-defined contractual model through QueryInterface, a standard COM mechanism for interface (and hence versioning) negotiation. The COM interface is location independent and imposes almost no overhead in the local case.

The CAM 354 is kept independent of the implementation details of how the stub communicates with the spooler component 356 by virtue of the IPrtIsolationStub interface, which is completely independent of the type of component being instantiated. This independence provides the desirous attribute of enabling the CAM 354 to be easily extended to handle other printing components (or even future nonprinting components).

The print-processor shim 326 exposes the same interface as the print-processor stub 342. It acts as a facade to an otherwise-perceived unreliable component interface. The print-processor shim 326 is notified by the CAM 354 (or its equivalent) when the process to which its proxy object refers is torn down. In response, the shim 326 releases the print-processor proxy 334 and restarts the print-processor stub 342 when the next call is received. Any handles (or interfaces) returned to the spooler 356 will fail their remaining calls. The spooler 356, if desired, can reopen them.

The print-processor shim 326 determines whether any active calls are currently executing in a proxy 334. The CAM is kept isolated from the implementation details of the component shim through the IPrtIsolationShim interface. This allows the CAM to be easily extended to instantiate other types of spooler components.

Component Activation Manager Implementation

CAM 354 is isolated from the printing space. Conceptually, the CAM 354 is isolated from print-component-specific interfaces but may run in the spooler process.

Thus, the CAM 354 is not necessarily isolated in the sense of address space. The printer drivers stored inside it are referred to herein as "features" for the sake of clear nomenclature. A feature consists of multiple components. An exemplary component may be "unidrive" and any files that it needs. Another exemplary component might be which graphics-primitives file and the driver user interface plug-ins. Thus, a printer driver may correspond to a feature in an installer package. The term "component" is more typically associated with a group of COM interfaces and because sandboxing support is preferably built closely around COM, the feature will often correspond to a sandbox component.

The data structures and implementation of the CAM 354 will be described before elaborating on the various configurations of shims/clients and stubs that the CAM 354 supports.

Figure 4:
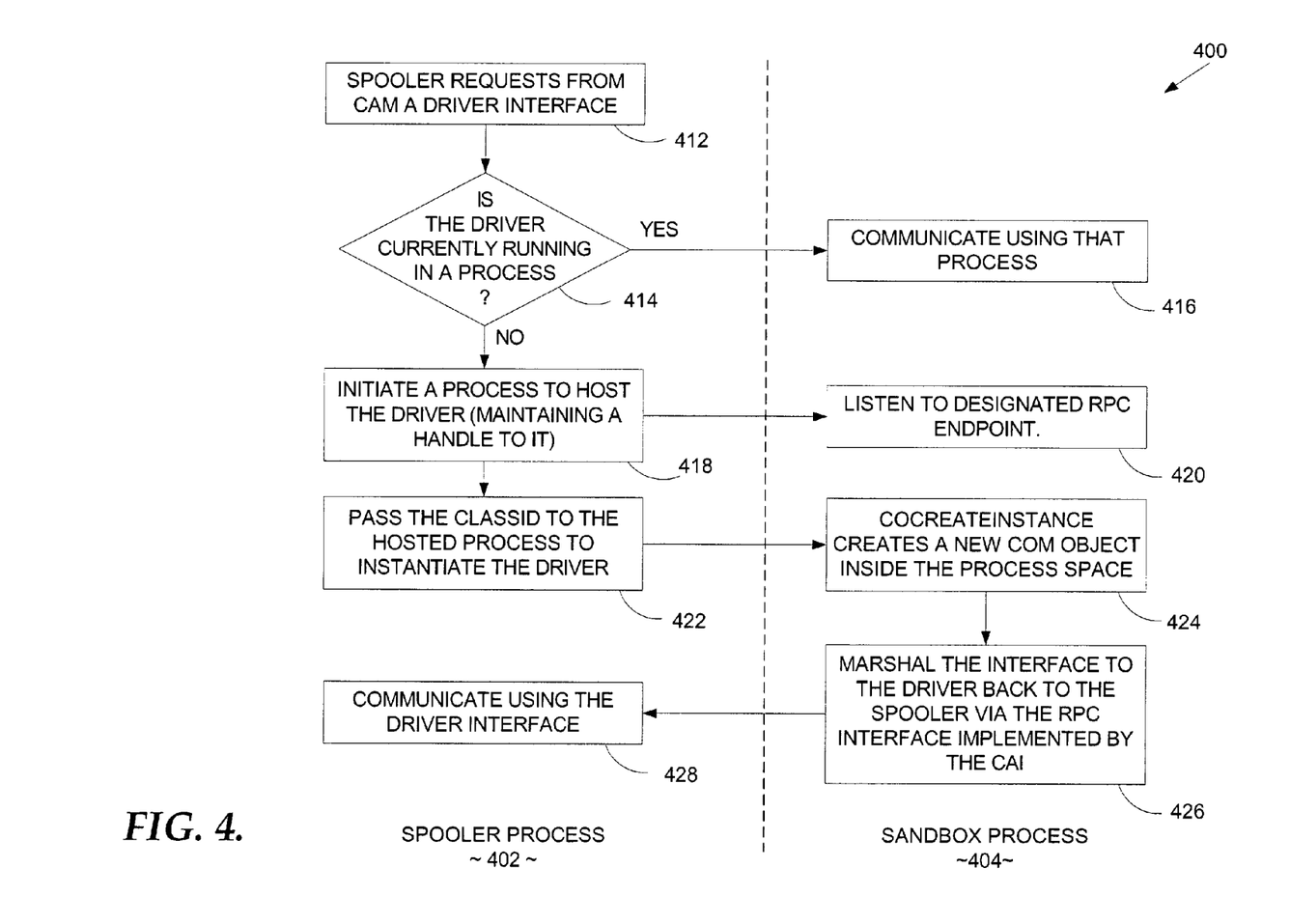
FIG. 4 is a flow diagram depicting an illustrative method of the present invention.

An exemplary method for executing the present invention is provided in FIG. 4 and referenced generally by the numeral 400. As shown, two control flows occur: one in a spooler process 402 and one in a sandbox process 404. These two flows are distinguished for clarity; their distinction should not be construed as a limitation of the present invention. When the spooler 356 tries to hook to a printer driver, it requests from the CAM 354 a printer-driver interface at a step 412. The CAM in turn can retrieve the driver interface from the sandbox process via the CAI. CAM 354 determines whether the driver requested is currently running in a process at a step 414. If so, communication commences using that process at a step 416. If not, CAM 354 initiates a process at a step 418 to host the driver (while maintaining a handle to it) and retrieve the driver substantiated in the hosted process. Preferably, CAM 354 monitors the processes for failure and restarting needs.

At a step 420, the present invention listens to a designated endpoint. That is, the CAI 358 listens to a designated RPC endpoint; the CAM 354 communicates to the sandbox process via the CAI 358. Designated in this context is a named RPC endpoint (RPC endpoints are identified by a name) that the CAM 354 creates randomly and then passes to the sandbox process. The sandbox process then starts the CAI 358 which implements the RPC interface that the CAM 354 will call.

At a step 422, the RPC endpoint implemented by the CAI passes the respective CLASSID to the hosted process to instantiate the driver. In a preferred embodiment, an API exposed by COM (such as CoCreateInstance) is used to create an object instance and retrieve an interface to communicate with it. At a step 424, CoCreateInstance creates a new COM object inside the process space and (at a step 426) marshals the interface to the driver back to the spooler via the RPC interface implemented by the CAI. This allows communication using the driver interface at a persisting step 428.

Figure 5A:
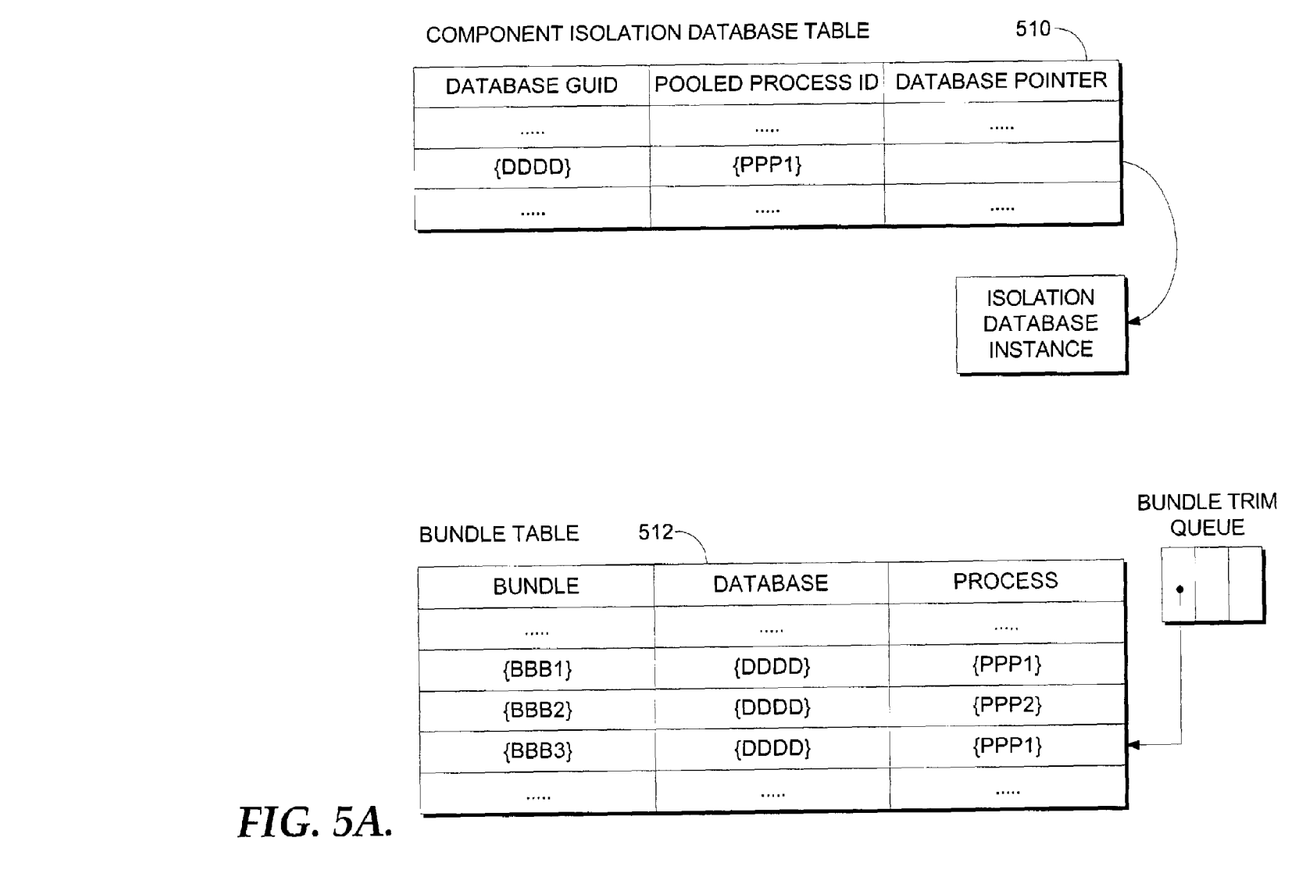
FIGS. 5A & 5B depict illustrative tables maintained inside the component activation manager (CAM)
Figure 5B:
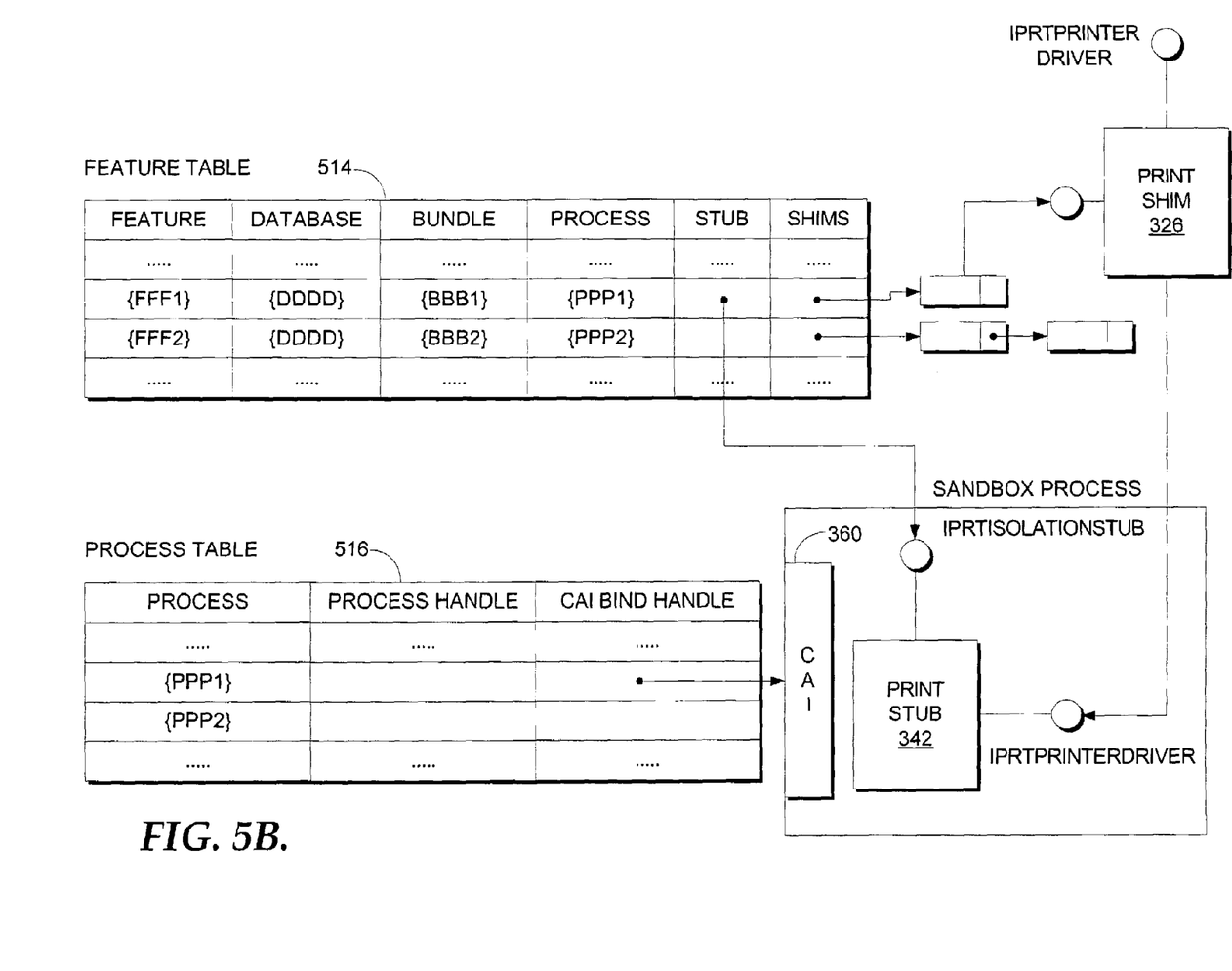

Turning to FIGS. 5A and 5B, CAM 354 includes four main tables: a component-isolation-database (CIDB) table 510, a bundle table 512, a feature table 514, and a process table 516. Each CAM 354 can reference a number of isolation databases. These are cached in the CIDB table 510. Each isolation database can have a unique identifier that identifies it for its lifetime. When an "out of proc (pooled)" isolation level is returned for a given bundle, the pool is maintained per loaded database. Thus, each isolation database maintains a lifetime-controlling soft reference to the isolation process, which is {PPP1} as shown in this example.

Every loaded feature corresponds to a bundle. If the isolation level of a bundle is "out of proc (separate)" then each bundle will have an independent process. See {BBB2} in this example. Each bundle also thus maintains an independent reference to its process. To prevent processes from being created and torn down too frequently, bundles are cached for a desired interval, which is ten seconds in the preferred embodiment. If a feature inside the same bundle is loaded within this interval, it will be able to use the existing process. To this end, a bundle-trim queue is maintained for the bundle table.

The process table 516 keeps track of all of the active processes. It also maintains the reference to the CAI 358 and receives process-termination notifications, which are sent to the CAM 354 who then sends the notification to every shim instance 326 through the feature table 514.

The feature table 514 keeps track of all loaded features, not limited to those shown. Every feature maintains the lifespan on both the feature process and the bundle.

Figure 6:
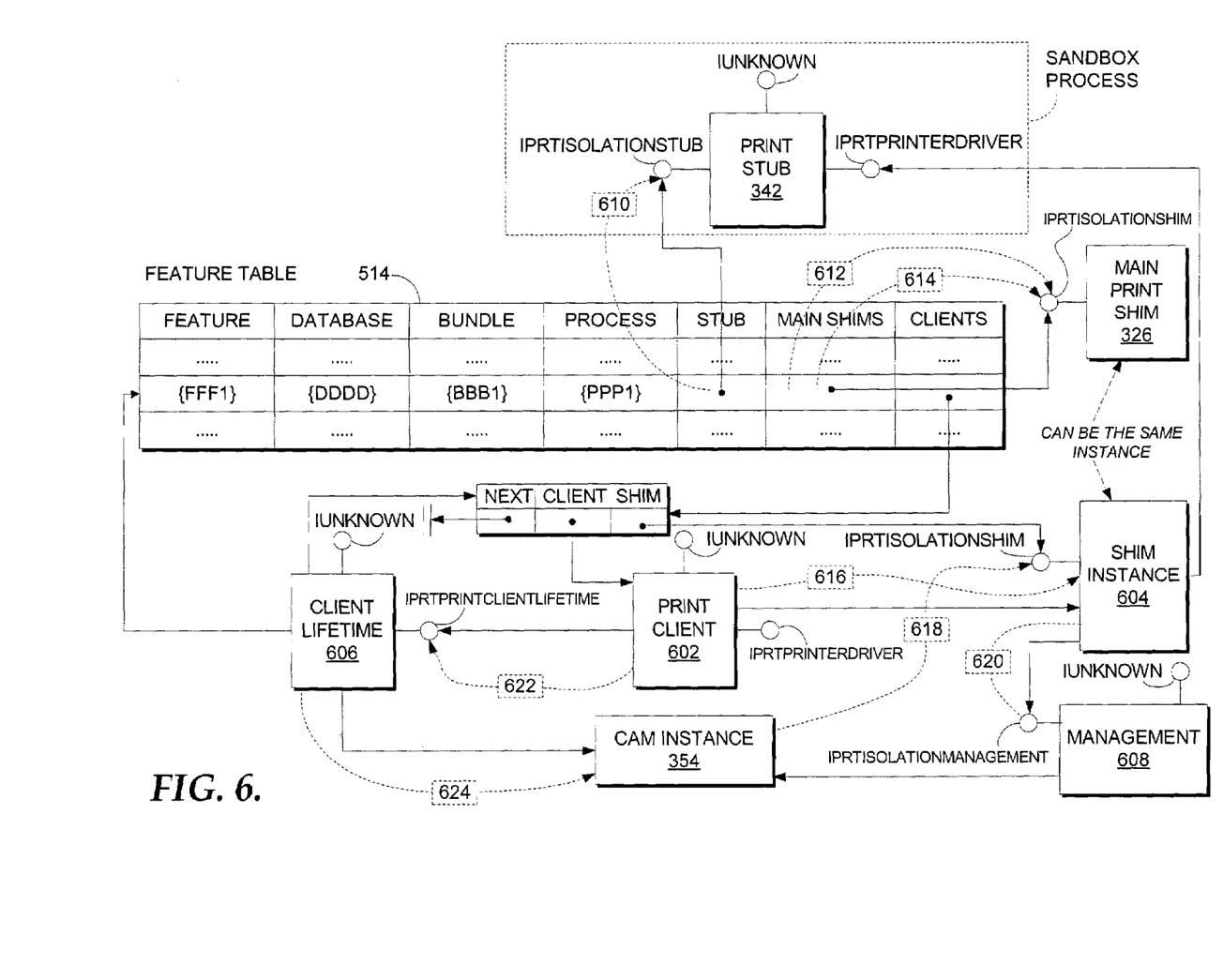
FIG. 6 is a block diagram illustrating process flows and component communication paths in the CAM.

The feature table 514 can also look up all of the features that are executing in the same process (as a secondary key). The feature table 514 maintains a reference to the sandbox side component stub. It also maintains a list of the current client instance and shims. Here, the client is the spooler, and the server is the sandbox process Implementing a Sandboxing Shim FIG. 6 shows the various communication paths between the components in the CAM 354 for feature creation as well as the communication paths between components used during sandbox-process termination. The shims hide from the client the fact that the sandboxed components may actually be unreliable. The complexity of the shim 326 or 604 (they can be, but do not have to be, the same) depends on the sophistication of the client. As used herein, the "client" is the client of the component being sandboxed. In this example, the component being sandboxed is a print-processor and the client is the spooler. The server is the component instantiated in the sandbox process. The ability of the shim to hide the "server" side component's complexity also depends on the interface to the server. The CAM provides as much framework as is necessary to allow a comprehensive sandboxing solution without resulting in an impediment to the type of the component being sandboxed. Thus, the shim is responsible for all of the logic used in attempting to communicate with the stub and reestablishing its link to the stub component. One should clarify the difference between a stub "instance" (stub), which is the instance of a stub object sitting in the sandbox process, and the act of communicating with an instantiated new stub, which is an instance of the stub class. If the process is terminated, the instance of the current stub that was being communicated with must be torn down. Communication is reestablished by creating a new instance of the class "stub."

The CAM provides assistance in a number of ways: it notifies the shim whenever the process the shim is communicating to is terminated; it provides a management interface that allows the shim to reacquire a new stub interface if it needs to; it provides support for either a singleton-shim-per-feature interface or a shim-per-client interface; it assumes a singleton-stub-per-feature interface but is easily modifiable. In addition, a template library is provided in the sandboxing common library to simplify the creation of reliable component shims.

The notification system gives rise to two lifetime-control issues. First, the client interface obtained by the caller must maintain the lifespan on the CAM 354. One reason for this is that when the last instance of the activation manager 354 is pulled down, all the sandbox processes will also be pulled down with it. Second, the CAM 354 needs to maintain a reference on the shim 326 or 604 to send notifications to it. However, the client needs to be able to release its interface by simply calling the client release.

The CAM 354 solves these shortcomings by calling the designated method of the main shim, which in a preferred embodiment is IprtIsolationShim::BindToStubAnd-ObtainClientInstance. The main shim 326 returns the new client interface through this call as well as a shim instance 604. This shim instance 604 can be the main shim instance 326, or it could be a per-client shim. If the shim returns itself, then the CAM 354 will only send it one event. The shim 326 can also create a new shim object at this point. The shim could also communicate with the stub 342 to obtain a new stub instance at this point.

Through this technique, at least three possible arrangements of clients and shims emerge. The first arrangement includes many client instances, one shim instance, and one stub instance. Note, the shim could return itself and a new client as a reference. The second arrangement includes many client instances, a shim instance per client, and one stub instance. Here, the shim returns a new client and a new shim when asked to obtain an instance. A final exemplary arrangement includes many client instances, a shim instance per client and a stub instance per client. Here, the shim communicates with the stub to obtain another stub, returns a new shim instance, and obtains another client instance.

Some reliability issues are present with shims and process-termination events. When a process terminates, every shim for every feature currently executing in the process is guaranteed to be given a notification. However, there is no synchronization between the clients and the shim interface. A call could be received from the client before a notification is received from the CAM 354. The stub instance held by the shim will still be valid (if disconnected); it will simply fail subsequent calls. Thus, for a shim (such as shim 326) to perform successfully each time called, it should make these calls in a loop and obtain new stub instances from the CAM 354 if the call failure indicates that the communication to the stub (such as stub 324) failed because the process hosting it no longer exists.

An important issue is how the stub is identified by the shim and the CAM. Whenever a stub is returned to the shim, it is also given a stub ID, or process ID. Whenever the shim requests a new stub interface, it passes its stub ID to the CAM 354 (process-termination events also carry the stub ID to the shim). If the stub does belong to the correct process in the feature, a new process will be started and the new stub ID will be returned. If the process has already been terminated, then the existing stub ID will be returned to the shim along with the existing stub. The shim must be careful to only request a new stub when the process has really terminated or it could result in process churn, where more processes are being created than is necessary.

A related issue involves process-termination notification. Because the shim will have already changed the process bound to a given feature when the notification arrives, it might not receive a process-termination notification. But because it has already recycled its stub instance, it should not need to.

With further reference to FIG. 6, dashed lines represent steps (610-624) of an illustrative process carried out by the present invention. At step 610, activation properties are passed to print stub 342 and the main shim CLSID is obtained. At a step 612, main shim 326 is instantiated. The present invention, at a step 614, then obtains a print client instance 602 and shim instance 604, and passes in activation parameters, a client lifetime 606, and a management interface 608. At a step 616, the client 602 passes calls through the shim instance 604 to the stub 342. Note, the client 602 can also directly call the stub 342. At a step 618, CAM 354 sends process-termination events to the shim instance 604. On process termination, or call failure, the shim instance 604 requests a new stub through the management interface 608 at a step 620. Management interface 608 maintains a nonlifetime maintaining key to the feature it is contained in. Print client 602 releases the client-lifetime interface 606 when released by its respective caller at a step 622. At a step 624, client lifetime 606 calls the CAM 354 to release the respective feature, the client instance 602 and its reference on the CAM 354.

Shim Helper Library

Because the shim is a reasonably complex component, a shim-library helper is preferably provided. It performs the following functions. First, it provides a default implementation of the Event Handle. This confirms that the stub ID is correct and, if it is, clears the current stub pointer. Second, it handles concurrency issues when accessing the stub. Third, it produces a class meta-event that is guaranteed to be called whenever a stub instance needs to be recycled (either through the shim discovering the stub is disconnected during a call or through the process-termination notification). Third, it provides a helper function that very simply implements the retry logic for a given shim instance.

Stub Side State

There are two aspects that should be considered when writing a shim 326:

the intelligence of the client and the state maintained in the stub. The client may be intelligent enough to either periodically recycle its interface or recycle it when it starts failing. If this is the case, then the simplest implementation is to have a shim and a stub for every client instance and do nothing in the shim 326. If the server is reasonably stateless, and the client is unintelligent, then the shim 326 can simply ensure that every call is made reliable. If the server is not stateless and the client is unintelligent, then the shim 326 essentially needs to mirror all of the server state in order to reconstruct it when it is recreated.

Those skilled in the art will appreciate hybrids that can be used. For example, a print processor has a handle that is bound to the server-side state. Some print-processor calls can be guaranteed. But once the handle becomes invalidated, all remaining calls on the handle will fail. The spooler will need to be modified to intelligently cycle print-processor handles. The simplest way to implement this is to embed the stub interface used to open the handle in a dummy handle that is returned to the caller. If the end point becomes unavailable, then the handle will automatically start failing its calls. A new handle will have a different stub interface and hence succeed.

Applications for the present invention abound. The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations and are contemplated and within the scope of the claims.

The invention claimed is:

1. A computer-program product comprising one or more computer-readable media having computer-useable instructions embodied thereon for isolating one or more printer drivers associated with a computing system comprising:

a first virtual process boundary that isolates a spooler process from an application process, wherein said application process comprises a first procedure-calling component that communicates data across said first virtual process boundary to said spooler process and a printing API (application program interface) that provides communication between an application requesting printing functionality and said procedure-calling component, and wherein said spooler process comprises:
(1) a second procedure-calling component;
(2) a data-routing component in communication with said second procedure-calling component;
(3) a print-processor shim communicatively coupled to said data routing component; and
(4) a print-processor proxy communicatively coupled to said print-processor shim and to said second procedure-calling component; and a second virtual process boundary that isolates said spooler process from a sandbox process, wherein said second virtual boundary protects an address space of a printing system associated with said computing system from one or more printer drivers of said sandbox process.

2. The computer-program product of claim 1, wherein said data-routing component provides data communication from said first procedure-calling component through said second procedure-calling component to said print-processor shim.

3. The computer-program product of claim 2, wherein said sandbox process comprises:
a printer driver;
a graphics-device interface (GDI) in communication with said printer driver;
a print processor in communication with said GDI;
a print-processor stub in communication with said print processor; and
a third procedure-calling component in communication with said print-processor stub, wherein said third procedure-calling component passes data communicated from said print-processor proxy in the spooler process to the print-processor stub in the sandbox process.

4. The computer-program product of claim 3, wherein said sandbox process further comprises a printing API that provides communication with said data-routing component in said spooler process.

5. A set of one or more interfaces embodied on one or more computer-readable media for isolating one or more printer drivers within a computing system having a print system, the interfaces comprising:
a sandbox process comprising a component-activation interface (CAI, a print-processor interface, a print-processor stub, and a printing-component; and
a spooler process comprising a component activation manager (CAM), a spooler, and a printing-processor shim, wherein said CAM performs at least one of tracking one or more sandbox processes created, monitoring one or more component stubs maintained in each sandbox process and notifying all printing component shims when one of said processes terminates unexpectedly, and
wherein further said CAM comprises the following data structures:
(1) a component-isolation data structure that maintains a reference to one or more isolation processes; a bundle data structure that associates one or more bundles of printer drivers with said component-isolation data structure and one or more of said isolation processes;
(2) a feature data structure that retains a plurality of printer-related offerings associated with the component-isolation data structure, bundle, and isolation processes;
(3) a process data structure that tracks a plurality of active processes.

6. The interface set of claim 5, wherein said one or more bundles or printer drivers includes at least one selection from the following:
a signed-drivers bundle that denotes drivers that have been certified by a chosen entity;
an unsigned-drivers bundle that denotes drivers not recognized to be associated with a trusted source;
a risky-drivers bundle that denotes unreliable drivers that are sufficiently functional to be used by said computing system; and/or
an unknown-drivers bundle that denotes drivers that are not determined to be either signed or unsigned.

7. The interface set of claim 6, wherein each of said one or more bundles is associated with an isolation level.

8. The interface set of claim 7, where said associated isolation level is one of the following:
a first isolation level in which printer drivers run in a same process as the spooler;
a second isolation level in which printer drivers run in a pooled process common to the print system; and
a third isolation level in which printer drivers run in defined process.

9. The interface set of claim 6, wherein said component-activation interface (CAI) interacts with said computing system to help startup said sandbox process.

10. The interface set of claim 9, wherein said CAI interacts with said computing system to help shut down said sandbox process.

* * * * *

UNITED STATES PATENT AND TRADEMARK OFFICE
CERTIFICATE OF CORRECTION

| | | |
|---|---|---|
| PATENT NO. | : 7,508,532 B2 | Page 1 of 1 |
| APPLICATION NO. | : 10/441572 | |
| DATED | : March 24, 2009 | |
| INVENTOR(S) | : Mark Lawrence | |

It is certified that error appears in the above-identified patent and that said Letters Patent is hereby corrected as shown below:

In column 15, line 44, in Claim 5, delete "(CAI" and insert -- (CAI) --, therefor.

Signed and Sealed this
Third Day of May, 2011

David J. Kappos
*Director of the United States Patent and Trademark Office*